United States Patent [19]
Handke et al.

[11] Patent Number: 5,649,691
[45] Date of Patent: Jul. 22, 1997

[54] SHOCK ABSORBER AND PNEUMATIC SPRING ASSEMBLY

[75] Inventors: Günther Handke, Euerbach, Germany; Rolf Wengenroth, Harrison Township, Mich.

[73] Assignee: Fichtel & Sachs AG, Schweinfurt, Germany

[21] Appl. No.: 331,350

[22] Filed: Oct. 28, 1994

[30] Foreign Application Priority Data

Nov. 3, 1993 [DE] Germany ............................ 43 37 419.0
Jul. 23, 1994 [DE] Germany ............................ 44 26 243.4

[51] Int. Cl.$^6$ ........................................................ F16F 9/05
[52] U.S. Cl. ................................... 267/64.21; 262/64.24
[58] Field of Search ........................... 267/64.24, 64.21, 267/64.27, 122

[56] References Cited

U.S. PATENT DOCUMENTS

| | | |
|---|---|---|
| 4,555,096 | 11/1985 | Pryor . |
| 5,009,401 | 4/1991 | Weitzenhof ............... 267/64.21 |
| 5,129,634 | 7/1992 | Harris ...................... 267/64.24 |

FOREIGN PATENT DOCUMENTS

| | | |
|---|---|---|
| 3403648 | 8/1984 | Germany . |
| 3720729 | 1/1988 | Germany . |
| 3907462 | 9/1990 | Germany . |
| 1305942 | 2/1970 | United Kingdom . |
| 1248025 | 9/1971 | United Kingdom . |
| 2117866 | 10/1983 | United Kingdom . |

OTHER PUBLICATIONS

"Feinmechanische Bauelemente", Siegfried Hildebrand Carl Hanser Verlag, Munich, 1978, pp. 245 and 390.

*Primary Examiner*—Matthew C. Graham
*Attorney, Agent, or Firm*—Nils H. Ljungman and Associates

[57] ABSTRACT

Pneumatic spring, comprising a spring bellows acting as a rolling bellows, whereby the spring bellows borders a spring chamber filled with gas under pressure. The gas is supplied to the spring chamber by means of a pressure connection, whereby the spring bellows is connected on one hand to an axially-movable outer tube, and on the other hand via a roll-off tube. The roll-off tube is engaged with a spring bracket, and the roll-off tube, together with a mounting device on the spring bracket, forms a locking connection which locking connection defines the axial position of the roll-off tube.

19 Claims, 9 Drawing Sheets

5,649,691

SHOCK ABSORBER AND PNEUMATIC SPRING ASSEMBLY

BACKGROUND OF THE INVENTION

1. Field of the Invention

The present invention generally relates to a pneumatic shock absorber having bellows, which bellows can act as rolling bellows. The bellows define the borders of a spring chamber filled with gas under pressure. The bellows are connected, on one hand to an axially movable outer tube, and, on the other hand to a roll-off tube, which roll-off tube is actively connected to a spring bracket.

2. Background Information

German Utility Model G 88 13 045 discloses a pneumatic shock absorber which has a roll-off tube to influence the spring force as a function of the stroke length. The roll-off tube is supported axially essentially only by means of a locator ring. On long pneumatic shock absorbers with correspondingly long strokes, there is essentially no way to prevent a displacement of the roll-off tube beyond the spring bellows during a rebound motion. Of course, in the event of a subsequent inbound motion, the roll-off tube will be at least partly pushed back, but then the roll-off tube will still not be in the desired position. For the embodiments of pneumatic springs in which the pneumatic connection is a component of the roll-off tube, there is the additional problem that the pneumatic hose is constantly exposed to the mechanical stresses resulting from the relative movement between the compressed air connection and a second fastening point, e.g. a strap, a valve or even a hose clamp.

OBJECT OF THE INVENTION

The object of the present invention is to solve the problems experienced in similar devices of the past.

SUMMARY OF THE INVENTION

The present invention teaches that this object can be achieved by means of a roll-off tube, which roll-off tube can preferably form a locking connection along with a mounting on the spring bracket. This locking connection can preferably define the axial position of the roll-off tube.

In accordance with the present invention, the roll-off tube is essentially always stationary with respect to the spring bracket. In terms of the retaining forces of the locking connection, the locking connection can preferably be designed so as to be able to withstand even extreme situations, such as when a motor vehicle is on a hoist.

The locking connection on the roll-off tube side can preferably be formed by at least one flexible tab. The configuration of the locking connection in accordance with the present invention can make it possible to determine, by visual inspection, whether the locking connection is correctly engaged.

The mounting device can be advantageously designed so that it encircles the spring bracket, at least in sections. An essentially simple disc welded to the spring bracket is typically sufficient.

In accordance with one embodiment of the present invention, the roll-off tube can preferably be axially braced on the mounting device, preferably by means of the flexible tab. However, in accordance with an alternative embodiment of the present invention, it can be possible to have the roll-off tube braced on the spring bracket by means of a bottom element.

In addition to the axial positioning of the roll-off tube in relation to the spring bracket, there can preferably be a rotary installation orientation between the roll-off tube and the spring bracket. There can essentially be no relative motions of any type between the roll-off tube and the spring bracket. In particular, with parts which are flexible in three dimensions, essentially no mechanical loads are transmitted to a supply hose, which supply hose can preferably be connected to the pressure connection.

In one possible embodiment of the present invention, preferably for a rotary installation orientation, there can preferably be a recess in which a web can be engaged between the spring bracket and the roll-off tube.

The above-described embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

A pneumatic spring and a shock absorber assembly, the assembly comprising: a shock absorber, the shock absorber comprising: a sealed cylinder defining a chamber therein, the cylinder containing a damping medium; the cylinder having a first end portion and a second end portion and a length disposed substantially parallel to the longitudinal axis; a piston rod sealingly projecting into the first end portion of the cylinder and being axially displaceable with respect to the cylinder, the piston rod having a central longitudinal axis, the longitudinal axis defining an axial direction; a piston being attached to the piston rod, the piston being slidably disposed within the cylinder to sealingly divide the chamber into first and second chambers; means for permitting flow of damping medium between the first chamber and the second chamber; a pneumatic spring for applying a substantially axially directed force to the shock absorber; the pneumatic spring comprising: a roll-off tube surrounding at least a portion of the cylinder, the roll-off tube having a length disposed substantially parallel to the longitudinal axis; the length of the roll-off tube being substantially less than the length of the cylinder; means for applying a substantially axially directed force to the shock absorber; the means for applying a substantially axially directed force comprising: bellow means for expanding and contracting; the bellow means being disposed to roll-up on end roll off the roll-off tube; the shock absorber further comprising: means for holding the roll-off tube at the first end portion of the shock absorber; the roll-off tube and the mounting means together forming means for maintaining an axial position of the roll-off tube with respect to the shock absorber; and the first end portion being disposed a substantial distance from the second end portion.

BRIEF DESCRIPTION OF THE DRAWINGS

The present invention is explained below in greater detail with reference to the embodiments illustrated in the accompanying drawings, in which.

DESCRIPTION OF THE PREFERRED EMBODIMENT

Figure 1:
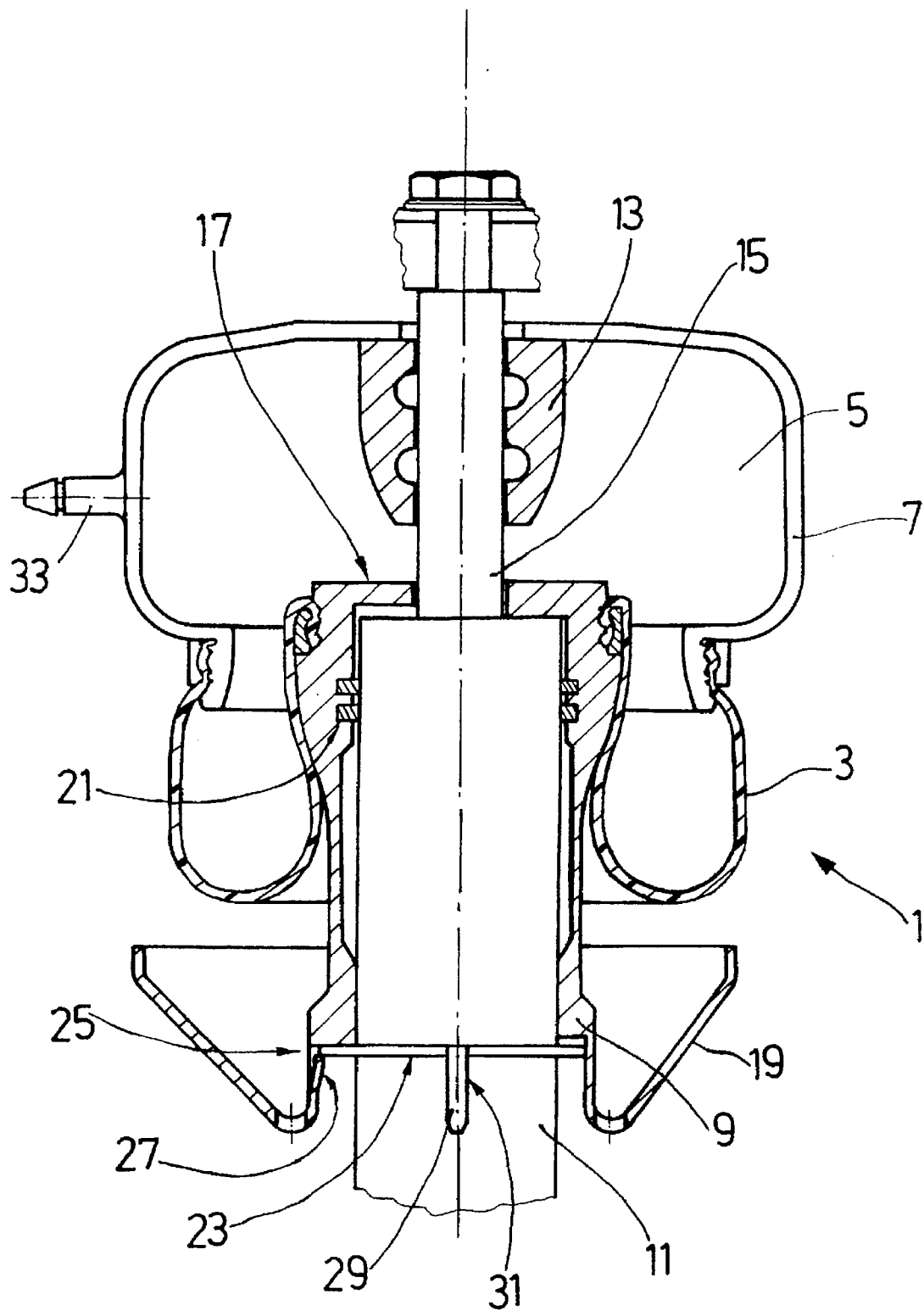
FIG. 1 shows a roll-off tube for a pneumatic spring with a deflector and stone guard.

FIG. 1 shows a pneumatic spring 1, which pneumatic spring 1 can include spring bellows 3, which spring bellows 3 can border, or at least partly define, a spring chamber 5. The spring bellows 3 can be connected on one hand to an outer tube 7, and on the other hand by means of a roll-off tube 9 to a spring bracket 11 or shock absorber.

In accordance with an alternative embodiment of the present invention, the spring bracket 11 could also be considered to encompass a spring support 11. In accordance with this interpretation, a shock absorber could be considered to be a spring support, in that a shock absorber can typically function as a spring support for a coil spring, which coil spring will surround the shock absorber and also the pneumatic spring 1. Thus, in accordance with at least one embodiment of the present invention, the reference numeral 11 could also be considered to represent the outermost tube of a shock absorber.

Figure 1A:
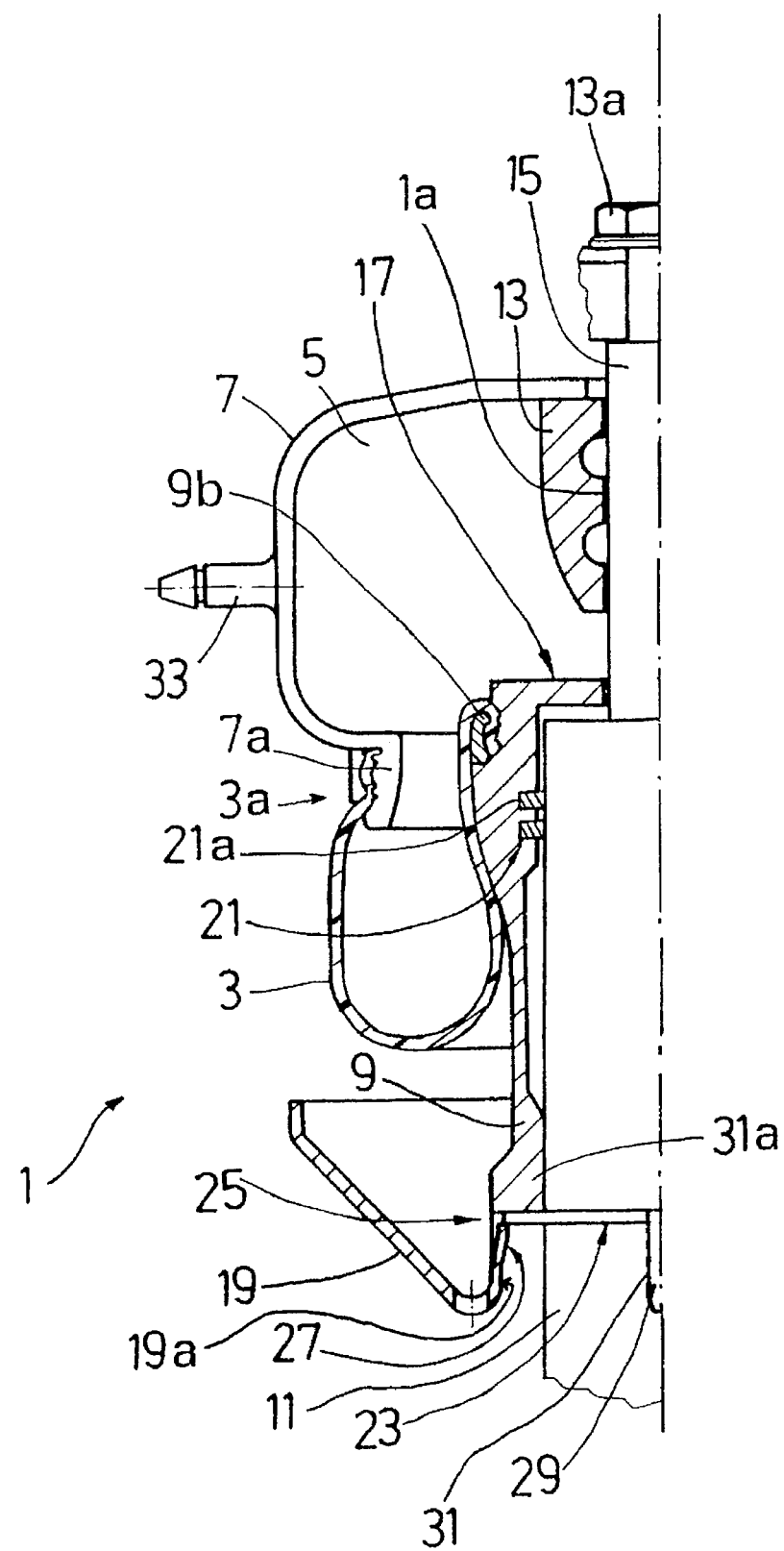
FIG. 1a shows the embodiment depicted in the left half of FIG. 1, and shows additional components.
Figure 1B:
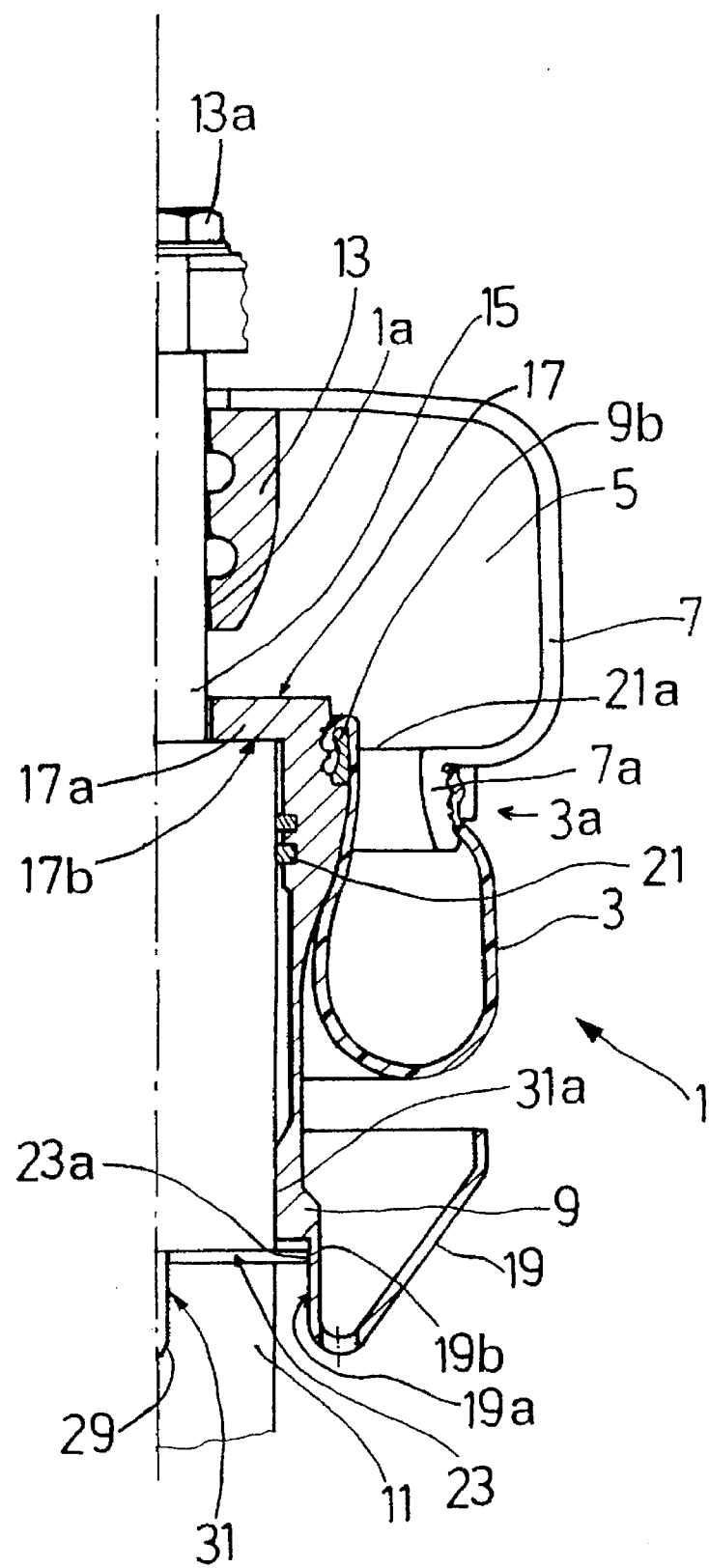
FIG. 1b shows the embodiment depicted in the right half of FIG. 1, and shows additional components.

In accordance with at least one embodiment of the present invention as shown in FIGS. 1a and 1b, the spring bellows 3 can be connected to the outer tube 7 by means of a clamping fastening 3a wherein one end of the spring bellows 3 can be clamped against a flanged portion 7a of outer tube 7, and the other end of the spring bellows 3 can be clamped between the roll-off tube 9 and an additional piece 9b. The piece 9b can possibly be welded, or otherwise fastened, to the roll-off tube 9 with the end of the spring bellows 3 clamped therebetween. Alternatively, piece 9b could be an integral component of roll-off tube 9. Of course, other methods of fastening spring bellows 3 would be within the scope of the present invention, such as an adhesive connection.

Inside the spring chamber 5, there can be an auxiliary spring 13. The auxiliary spring 13 can be braced on, or against, the outer tube 7, and can move in synchronization with a piston rod 15 of the shock absorber 11 relative to the roll-off tube 9. The roll-off tube 9 can have a deflector 17, on or against which deflector 17 the auxiliary spring 13 can be braced once the spring 13 has travelled a specified spring deflection distance. Moreover, a stone guard 19 can be integrated with the roll-off tube 9, so that the deflector 17, the tube body of the roll-off tube 9 and the stone guard 19 essentially form a single component.

In accordance with at one embodiment of the present invention, deflector 17, roll-off tube 9 and stone guard 19 could originally be manufactured as three separate components which three components could then be appropriately fastened to one another to form the present invention.

In accordance with at least one embodiment of the present invention, the pneumatic spring 1 can be attached to the piston rod 15 by means of a bolt 13a (see FIGS. 1a and 1b).

To seal the spring chamber 5 from the environment, the roll-off tube 9 can have at least one seal 21. In accordance with an additional embodiment of the present invention, roll-off tube 9 can have an additional seal 21a (see FIGS. 1a and 1b).

The roll-off tube 9, in accordance with the embodiment shown in the left half of FIG. 1 and as also shown in partial section in FIG. 1a, can be braced axially on a mounting 23, which mounting 23 can be appropriately fastened to the shock absorber 11. The mounting 23 and the roll-off tube 9 can form a locking connection 25, and the mounting 23 can essentially be in the form of a ring-shaped disc. For the locking connection 25 of the roll-off tube 9 to the mounting 23, there can be at least one flexible tab 27 which surrounds the mounting 23 and defines the axial position of the roll-off tube 9.

Thus, in accordance with at least one embodiment of the present invention, pneumatic spring 1 can be mounted on the shock absorber 11 by inserting the piston rod 15 through a central hole 1a (see FIGS. 1a and 1b) in pneumatic spring 1, which hole 1a can extend at least through the upper portion of the pneumatic spring 1. The pneumatic spring 1 can then be lowered towards the shock absorber 11 axially until the tab 27 moves past or clears the mounting device 23 on the shock absorber 11. Once the tab 27 clears the mounting device 23, the tab 27 can then "snap" towards the shock absorber 11, and lock the roll-off tube 9 into the desired axial position. Bolt 13a can then be used to secure the piston rod 15. Further, the pneumatic spring 1 can conceivably be removed, if desired, from the shock absorber 11 by compressing the tab 27 towards stone guard 19, and then lifting the pneumatic spring 1 upwards, away from the shock absorber 11. In other words, the tab 27 and the mounting device 23 can form a "form-lock".

In accordance with an alternative embodiment of the present invention, the roll-off tube 9 can be supported on the shock absorber 11 by means of the bottom element which forms the deflector 17, as illustrated in the right half of FIG. 1, and which is also shown in partial section in FIG. 1b.

In other words, and in accordance with at least one embodiment of the present invention, instead of a "tab" configuration being used to define the axial position of the roll-off tube 9 as shown in the left half of FIG. 1 and in FIG. 1a, the axial positioning of the roll-off tube 9 can be accomplished by a bottom element or bottom portion 17a (see FIG. 1b), which bottom element 17a can be integral with the deflector 17. This particular configuration can serve to axially position the roll-off tube 9, since the pneumatic spring 1 is fastened to the piston rod 15 by means of bolt 13a, and, since there is compressed air in spring chamber 5, this compressed air can serve to force the roll-off tube 9 towards the mounting device 23, wherein mounting devise 23 can serve as an axial stop to the roll-off tube 9. Thus, it is conceivable that as long as a certain amount of compressed air is kept in spring chamber B, the roll-off tube 9 can be at least somewhat axially fixed. Alternatively, there could conceivably be some sort of fastening of the roll-off tube 9 to the mounting device 23, for example a weld.

To position the stone guard 19, which can frequently cover essentially only a limited circumferential range or area on the shock absorber 11, there can be a web 29, which web 29 can be engaged in a recess 31 of the roll-off tube 9. Of course, the positioning can also be achieved by means of the inverse configuration. That is, in accordance with at least one embodiment of the present invention, the positioning of the stone guard 19 can be achieved by a web similar to web 29 which could be part of the roll-off tube 9. This web could then be engaged in a recess, similar to recess 31, which could be part of the shock absorber 11. Of course, other means of positioning the stone guard 19 would be within the scope of the present invention.

In accordance with at least one embodiment of the present invention, the configuration of the web 29 and recess 31 discussed above can serve to essentially fix the circumferential position of the roll-off tube 9 with respect to the shock absorber 11, possibly to essentially eliminate rotational movement of the roll-off tube 9 and the shock absorber 11, one with respect to the other. Of course, it should be understood that other configurations would be possible to provide a non-rotational relationship between the shock absorber 11 and the roll-off tube 9. Further, web 29 can, in accordance with one embodiment, be in the form of a projection extending radially outwardly from the surface of the shock absorber 11. Recess 31 can have several possible configurations. In accordance with one embodiment of the present invention, recess 31 could be disposed along the inner surface 19a of stone guard 19 of the embodiments shown in FIGS. 1a, 1b, 2a and 2b. However, in accordance with yet an additional embodiment of the present invention, recess 31 could be disposed in a portion 31a of roll-off tube 9 in the embodiments shown in FIGS. 1a, 1b and 2a, essentially axially above the mounting device 23, wherein web or projection 29 could also be disposed axially above mounting device 23.

In the pneumatic spring shown in FIGS. 1 and 1a, the compressed air can be supplied by means of a compressed air connection 33 in the spring bellows 7. Although not shown in FIG. 1b, the pneumatic spring 1 shown in FIG. 1b can also have a compressed air connection 33 disposed in the spring bellows 7, similar to that shown in FIGS. 1 and 1a.

In accordance with one embodiment of the present invention, mounting device 23 can be considered to be a holding device for holding the roll-off tube 9 in an axial position with respect to the shock absorber 11. In accordance with an additional embodiment of the present invention, surface 17b (see FIGS. 1b and 2b) can also be considered to be a holding device for holding the roll-off tube 9 in an axial position with resect to the shock absorber 11. Further, in accordance with yet an additional embodiment of the present invention, the stone guard 19 can have an interior surface 19b (see FIG. 1b) which makes contact with an circumferential surface 23a of the mounting device 23, thus, surface 19b can serve to minimize play between the mounting device 23 and the roll-off tube 9 and the stone guard 19.

Figure 2:
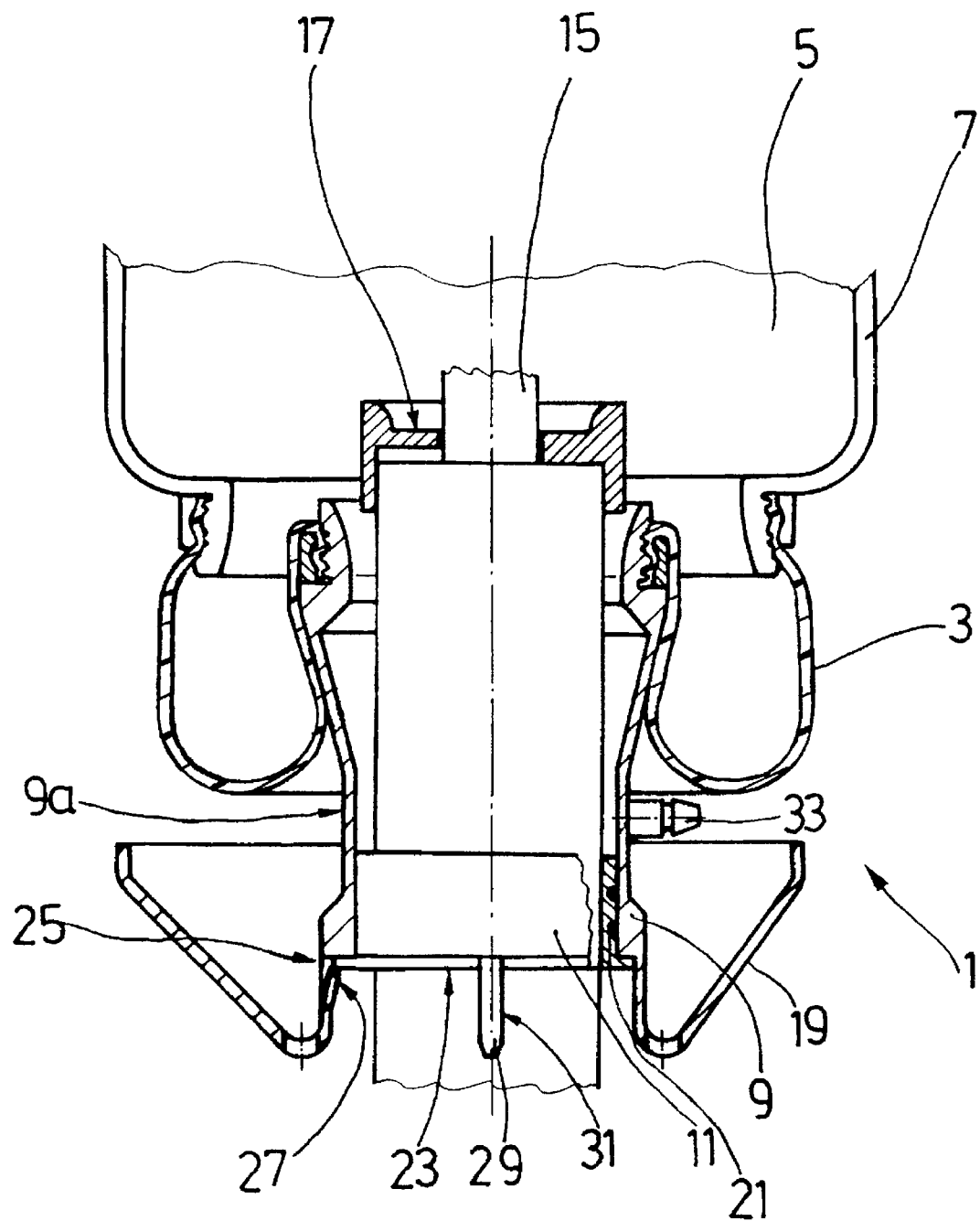
FIG. 2 shows a roll-off tube with a stone guard and a separate deflector.
Figure 2A:
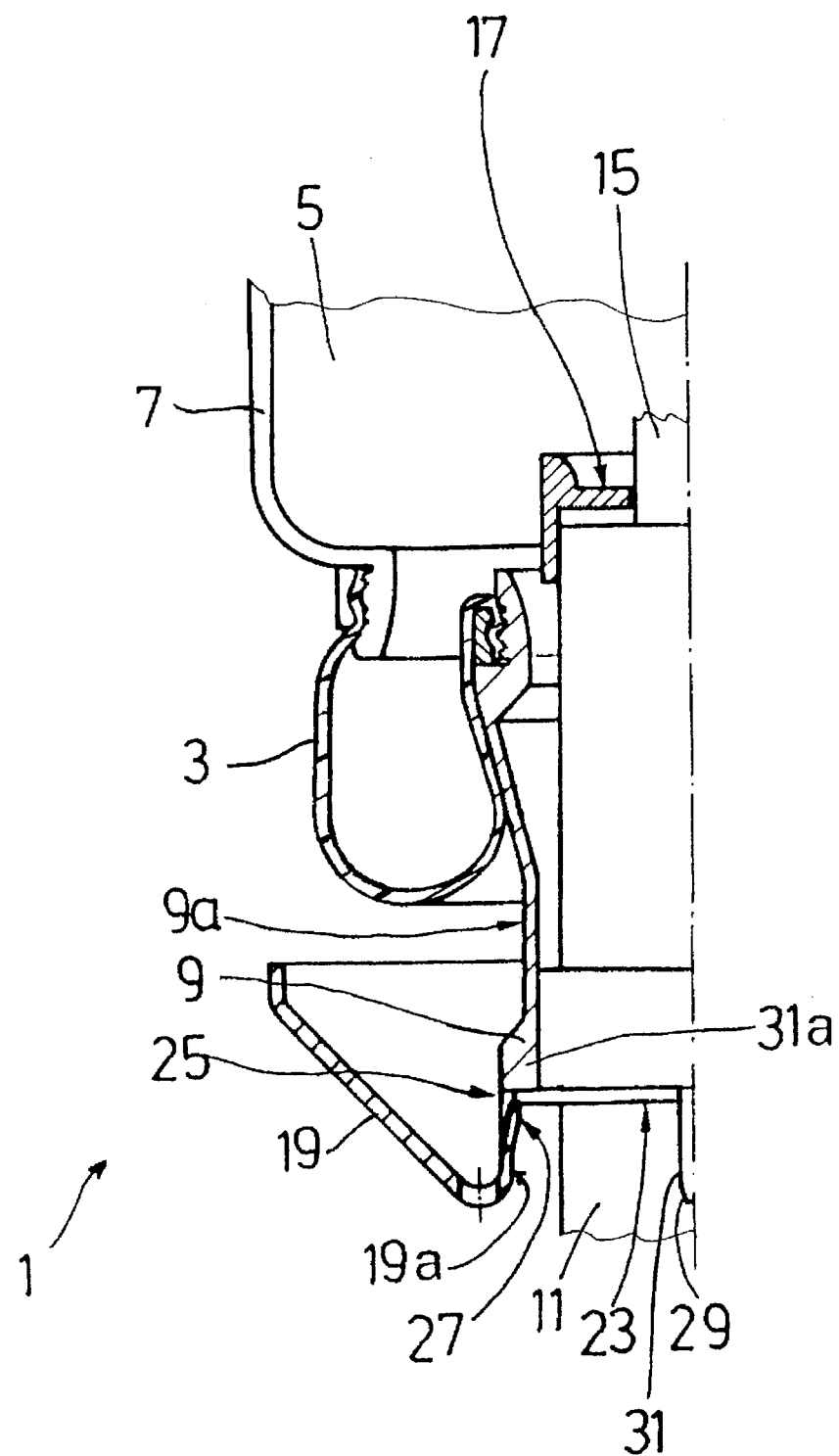
FIG. 2a shows the embodiment depicted in the left half of FIG. 2, and shows additional components.
Figure 2B:
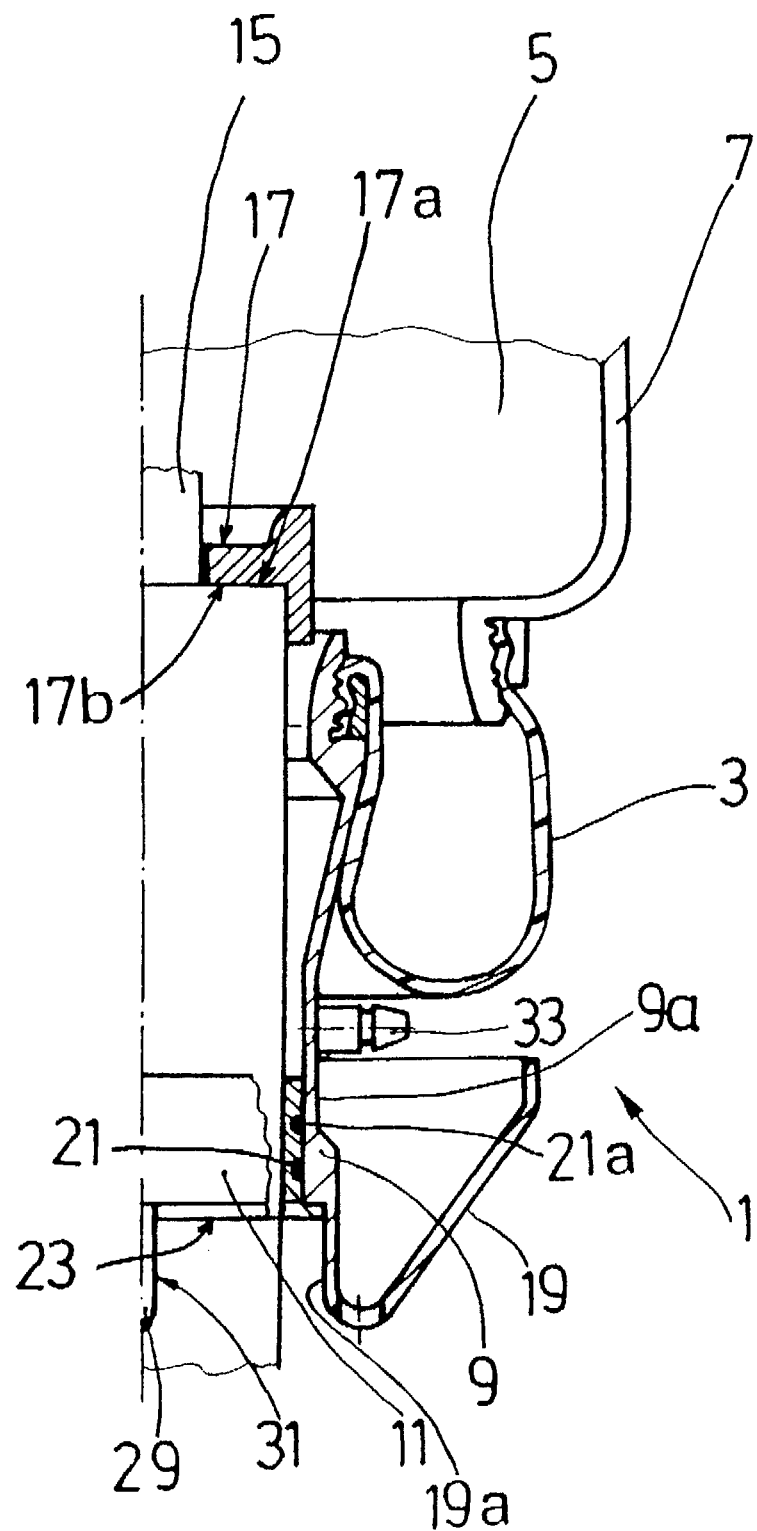
FIG. 2b shows the embodiment depicted in the right half of FIG. 2, and shows additional components.

Additional embodiments of the present invention are shown in FIGS. 2, 2a, and 2b. FIGS. 2, 2a, and 2b differ from FIGS. 1, 1a and 1b essentially in that the roll-off tube 9 and the stone guard 19 can form a single component, but the deflector 17 can be a separate component from the roll-off tube 9 and the stone guard 19. This embodiment of the present invention, in which the deflector 17 is separate from the roll-off tube 9 and the stone guard 19, can be appropriate in particular when the external contour 9a of the roll-off tube 9 has a comparatively large outside diameter at or with respect to the end surface of the shock absorber 11. To prevent accumulations of material between the deflector 17 and the roll-off tube 9, there can be a separation of the two functional elements.

To increase the size of the effective spring chamber 5, the roll-off tube 9 can be sealed in the vicinity of the mounting 23, whereby at least one seal 21 can be located in the mounting 23 itself. In accordance with an additional embodiment of the present invention, the roll-off tube 9 can be sealed by an additional seal 21a (see FIG. 2b). It should be understood that the embodiment shown in the left half of FIGS. 2 and 2a also have seal 21 or seals 21 and 21a, which cannot be seen due to the particular section shown in FIG. 2a and in the left half of FIG. 2.

To clarify, the left half of FIG. 2 and FIG. 2a illustrate at least one embodiment of the present invention, while the right half of FIG. 2 and FIG. 2b illustrate at least one additional embodiment of the present invention. The embodiments of FIGS. 2a and 2b (i.e. the left end right halves of FIG. 2, respectively) differ in essentially the same way as the embodiments of FIGS. 1a and 1b (i.e. the left and right halves of FIG. 1, respectively), that is, the tab 27, which tab 27 is featured in the left half of FIG. 1 and in FIG. 1a, can be used to axially position the roll-off tube 9, as compared to the bottom portion 17a of deflector 17 which can be utilized to axially position the roll-off tube 9, as shown in the right half of FIG. 1 and in FIG. 1b.

In accordance with the embodiment of the present invention shown in FIGS. 2, 2a, and 2b, the pressure connection 33 can be a component of the roll-off tube 9. It should be understood that although not shown in FIG. 2a due to the particular section shown, the pneumatic spring 1 illustrated in FIG. 2a can also have a pressure connection 33 as a component of the roll-off tube 9. Further, in accordance with at least one embodiment of the present invention, on account of the lack of twisting which results from the rotary positioning, there can essentially be no relative motions between the pressure connection 33 and the spring bracket 11.

In other words, and in accordance with one possible embodiment of the present invention, due to the web 29/recess 31 configuration discussed above, twisting of the shock absorber 11 and the roll-off tube 9 with respect to one another can essentially be prevented. Further, when the roll-off tube 9 is being installed or mounted on the shock absorber 11, the roll-off tube 9 can be rotated about the shock absorber 11 until the recess 31 is aligned with the web 29. When the recess 31 is substantially aligned with the web 29, the web 29 will then slide into recess 31 and serve to "lock" the roll-off tube 9 into a circumferential position with respect to the shock absorber 11.

The embodiments of the pneumatic shock absorber 1 shown in FIGS. 1–2b can be installed on one end of a shock absorber. More specifically, the pneumatic spring 1 can be mounted, by means of mounting device 23, on spring bracket 11 as discussed hereinabove, which spring bracket 11 could, in accordance with at least one embodiment of the present invention, be a bracket for a coil spring. Coil springs are well known in the art and will not be discussed in any substantial detail herein. The coil spring can then be disposed about the shock absorber, i.e. the coil spring can surround the shock absorber in a motor vehicle suspension system. Alternatively, the pneumatic spring 1 could be mounted, by means of mounting device 23, essentially directly on the upper end of a shock absorber, with the coil spring surrounding the shock absorber and, the coil spring could possibly surround a portion of the pneumatic spring 1. Alternatively, the coil spring could possibly surround the shock absorber and substantially all of the pneumatic spring 1.

Figure 3:
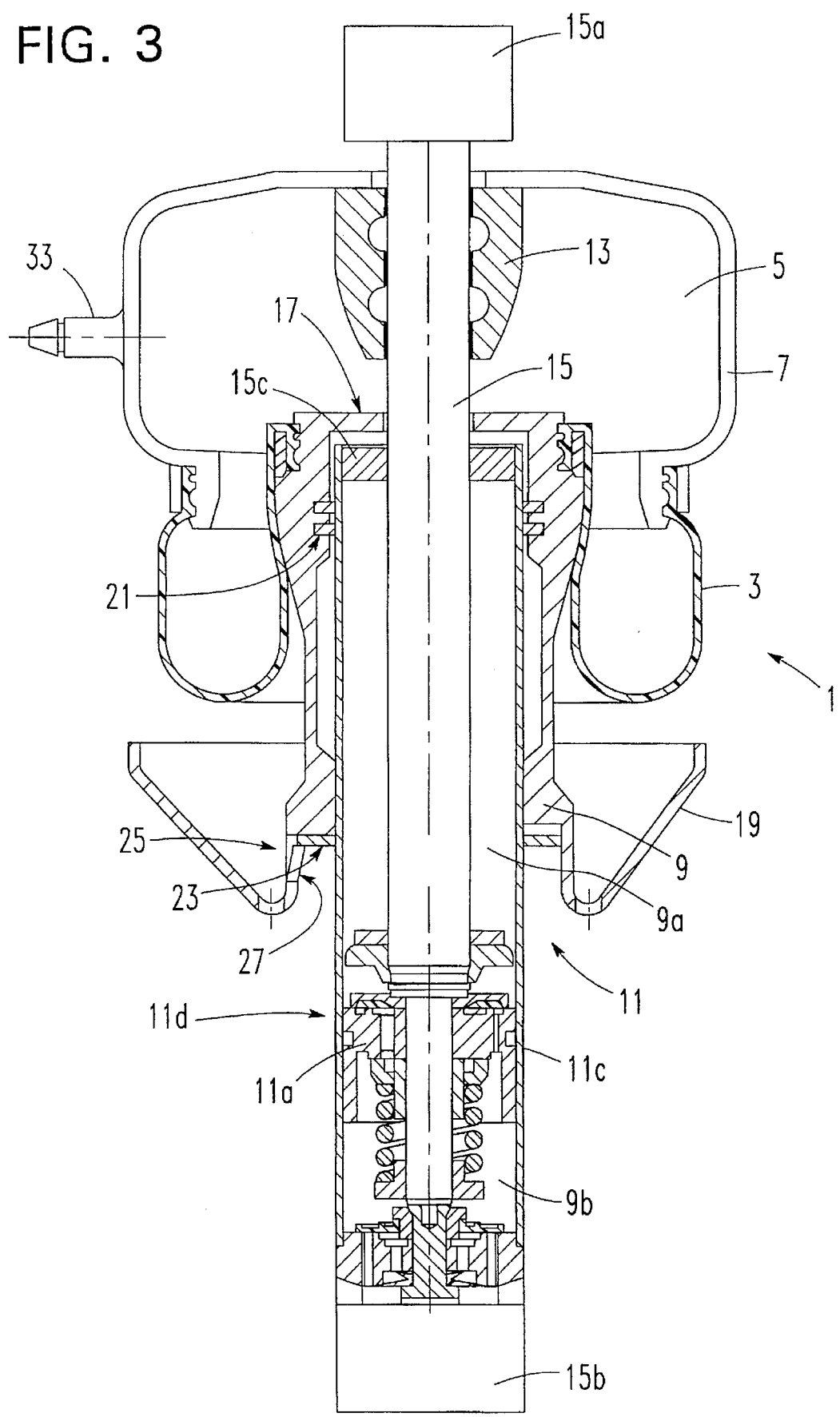
FIG. 3 shows a more complete pneumatic shock absorber incorporating the present invention.

FIG. 3 shows one example of a more detailed pneumatic shock absorber 1' which could incorporate the present invention. As shown in FIG. 3, piston rod 15 can extend into a cylinder 11c, and can be centered within cylinder 11c by means of a piston rod guide 15c. The piston rod guide 15c can be disposed at the upper end of cylinder 11c. Further, the piston rod 15 can move axially within cylinder 11c.

The piston rod 15 can be operatively connected to a piston 11a, which piston 11a, along with the piston rod 15, can move axially within cylinder 11c. The piston 11a can be equipped with a damping valve 11d.

The cylinder 11c can define a chamber which chamber can contain a damping medium. This chamber can be divided by the piston 11a into an upper working chamber 9a and a lower working chamber 9b. Further, there can also be a seal at or near the upper end of the cylinder 11c, which seal is not shown here but is well known in the art.

The pneumatic shock absorber 1' can also have fastening means 15a and 15b for fastening one end of the shock absorber 1' to the body of a motor vehicle, and the other end to the suspension of a motor vehicle.

Figure 4:
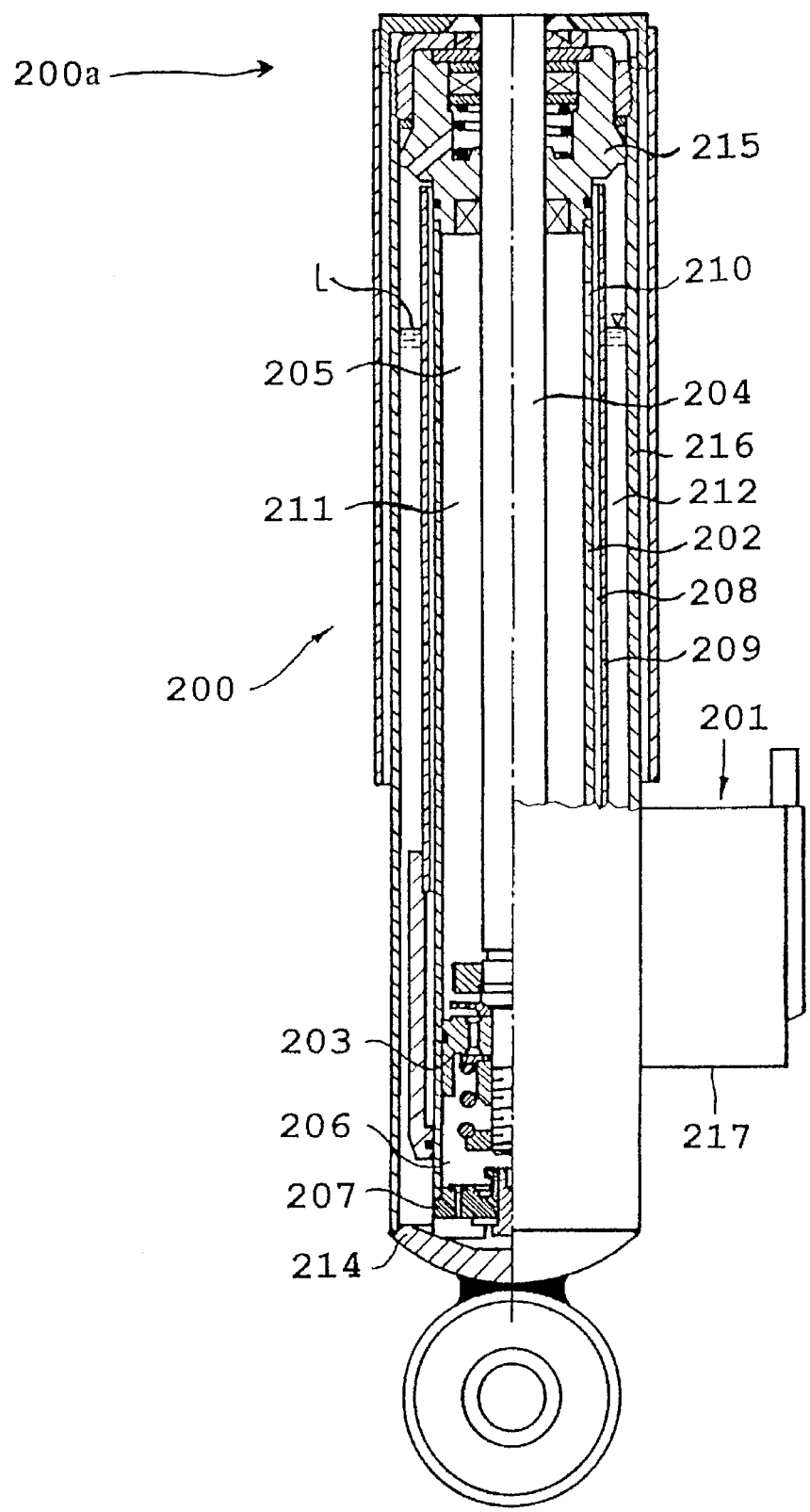
FIGS. 4 and 5 show an additional embodiment of a shock absorber which could incorporate the present invention.
Figure 5:
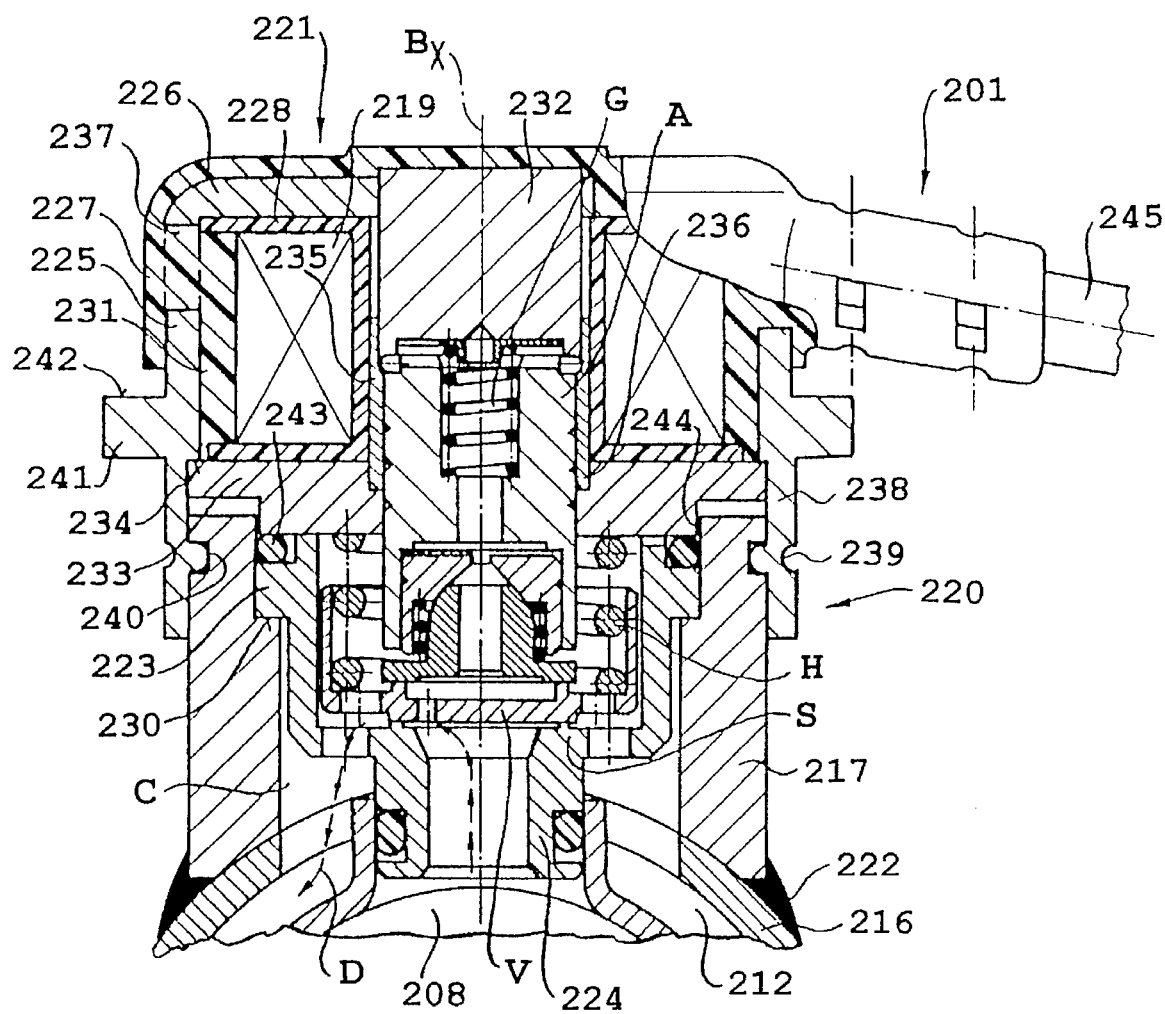

FIGS. 4 and 5 show an additional example typical shock absorber, vibration damper, or oscillation damper in which the embodiments of the present invention may conceivably be incorporated. It should be understood that various components found hereinbelow may be considered to be interchangeable with various components-discussed hereinabove with reference to FIGS. 1 through 3.

FIG. 4 shows a complete shock absorber or oscillation damper 200, a detailed illustration of the valve unit 201 being omitted for the sake of clarity. The pneumatic spring 1 could, in accordance with at least one embodiment of the present invention, be installed at an upper end 200a of the shock absorber of FIG. 4. The shock absorber or oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 5, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208,207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 5 one can again see the fluid path 208 and the compensating chamber 212, which are interconnectable through the valve unit 201. The fluid path 208 is connected to the upper working chamber 211 as shown in FIG. 4. The flow direction from the fluid path 208 to the compensating chamber 212 across the valve unit 201 is indicated in FIG. 5 by the dotted line D provided with arrows indicating the flow direction both for inward movement and outward movement of the piston rod 204 with respect to the pressure pipe 202. One can see in FIG. 5 a valve member V which can be lifted with respect to a valve seat S, such as to open the flow path D from the fluid path 208 to the compensating chamber 212.

For explaining the principles of the embodiment of the present invention shown in FIGS. 4 and 5, it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supple cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 223 is inserted into the side tube 217 and is axially located on a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral With an iron end wall 226. The iron Jacket 225 and the iron end wall 226 are coated with a plastic layer 227. The annular electromagnetic coil 219 is housed within the iron Jacket 225. This electromagnetic coil 219 is carried by a coil carrier 228, which is annular about the axis $B_x$ and is open in a radially outward direction. The coil carrier 228 is closed in the radially outward direction by a plastics material 231 integral with the plastic layer 227 through openings 237 of the iron jacket 225. The plastics layer 227 and the plastics material 231 are integrally moulded by injection moulding with the iron jacket 225, the iron end wall 226 integral therewith, and the electromagnetic coil 219 and carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and is engaged with a shoulder face 234 of the iron Jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron Jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in downward direction as shown in FIG. 5 toward the container tube 216 by a pretensioning tool engaging the container tube 216, on the one hand, and the pretensioning face 242, on the other hand. As such, the iron flange portion 233 can be pressed against the upper end of the valve components housing 223, the valve components housing 223 is engaged with the shoulder face 230 of the side tube 217, and the iron flange portion 233 is engaged with the shoulder face 234 of the iron jacket 22B. The helical compression spring H is compressed between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. As such, the compartment C confined by the side tube 217 and the cover unit 221 is sealed against atmosphere. All components of the valve unit 201 are positioned with respect to each other, and the helical compression spring H as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron Jacket 225 can occur.

The electromagnetic coil 219 is completely separated from the liquid within the compartment C by the iron flange portion 233. The pretension during connecting the cover unit 221 and the side tube 217 is selected such that no play can occur.

One feature of the invention resides broadly in the pneumatic shock absorber consisting of bellows acting as rolling bellows, whereby the bellows define the borders of a spring chamber filled with gas under pressure, whereby the bellows are connected on one hand to an axially movable outer tube, and are connected on the other hand by means of a roll-off tube which is actively connected to a spring bracket, characterized by the fact that a roll-off tube 9 with a mounting 23 on the spring bracket 11, forms the locking connection 25 which defines the axial position of the roll-off tube.

Another feature of the invention resides broadly in the pneumatic shock absorber consisting of bellows acting as rolling bellows, whereby the bellows define the borders of a spring chamber filled with gas under pressure, whereby the bellows are connected on one hand to an axially movable outer tube, and are connected on the other hand by means of a roll-off tube which is actively connected to a spring bracket, characterized by the fact that a roll-off tube 9 with a mounting 23 on the shock absorber 11, forms the locking connection 25 which defines the axial position of the roll-off tube.

Another feature of the invention resides broadly in the pneumatic shock absorber consisting of bellows acting as rolling bellows, whereby the bellows define the borders of a spring chamber filled with gas under pressure, whereby the bellows are connected on one hand to an axially movable outer tube, and are connected on the other bend by means of a roll-off tube which is actively connected to a spring bracket, characterized by the fact that a roll-off tube 9 with a holding means 23 on the shock absorber 11, forms the locking connection 25 which defines the axial position of the roll-off tube.

Another feature of the invention resides broadly in the pneumatic shock absorber consisting of bellows acting as rolling bellows, whereby the bellows define the borders of a spring chamber filled with gas under pressure, whereby the bellows are connected on one hand to an axially movable outer tube, and are connected on the other hand by means of a roll-off tube which is actively connected to a spring bracket, characterized by the fact that a roll-off tube 9 with a holding means 23 on the shock absorber 11, forms the stop 25 which defines the axial position of the roll-off tube.

Another feature of the invention resides broadly in the pneumatic shock absorber characterized by the fact that the locking connection 25 is formed on the roll-off tube 9 side by at least one flexible tab 27.

Yet another feature of the invention resides broadly in the pneumatic shock absorber characterized by the fact that the mounting is constructed, at least in segments, so that it encircles the spring bracket.

Still another feature of the invention resides broadly in the pneumatic shock absorber characterized by the fact that the roll-off tube 9 is braced axially on the mounting 23.

A further feature of the invention resides broadly in the pneumatic shock absorber characterized by the fact that the roll-off tube 9 is braced on the spring bracket 11 by means of a bottom element.

Another feature of the invention resides broadly in the pneumatic shock absorber characterized by the fact that between the roll-off tube 9 and the shock absorber 11, there is a rotary installation orientation.

Yet another feature of the invention resides broadly in the pneumatic shock absorber characterized by the fact that between the spring bracket and the roll-off tube there is a recess 31, in which a web 29 is engaged.

Examples of pneumatic springs, alternatively termed as "air springs" or "air shocks", and components thereof, which may be utilized in accordance with the embodiments of the present invention, may be found in the following U.S. Pat. No. 5,180,144, which issued to Hellyer et al. on Jan. 19, 1993; U.S. Pat. No. 5,009,401, which issued to Weitzenhof on Apr. 23, 1991; U.S. Pat. No. 4,988,082, which issued to Pees on Jan. 29, 1991; U.S. Pat. No. 4,332,397, which issued to Steger on Jun. 1, 1982; U.S. Pat. No. 4,166,522, which issued to Bourcier on Sep. 4, 1979; and U.S. Pat. No. 4,555,096, which issued to Pryor on Nov. 26, 1985.

Examples of shock absorbers, which may be utilized in accordance with the embodiments of the present invention may be found in the following U.S. Patents: U.S. Pat. No. 4,838,393, entitled "Hydro-mechanical Stop having a Restrictive Passage", which issued to Mourray et al. on Jun. 13, 1989; U.S. Pat. No. 4,817,928, entitled "Suspension System", which issued to Paton on Apr. 4, 1989; U.S. Pat. No. 4,527,674, entitled "Shock Absorber with a Hydromechanical Stop", which issued to Mourray on Jul. 9, 1985; U.S. Pat. No. 4,962,916, entitled "Compression Spring", which issued to Palinkas on Oct. 16, 1990; and U.S. Pat. No. 4,756,516, entitled "Resiliently Deformable Element Usable as an End Stop in a Motor Vehicle Suspension", which issued to Tondato on Jul. 12, 1988.

Examples of suspension systems, which may be utilized in accordance with the embodiments of the present invention may be found in the following U.S. Patents: U.S. Pat. No. 5,286,059, entitled "Height Control System When Vehicle is Jacked Up," which issued to Tabe; U.S. Pat. No. 5,180,024, entitled "Vehicle Height Control Apparatus," which issued to Eto; U.S. Pat. No. 5,324,056, entitled "High Performance Automobile Suspension," which issued to Orton.

The invention as described hereinabove in the context of the preferred embodiments is not to be taken as limited to all of the provided details thereof, since modifications and variations thereof may be made without departing from the spirit and scope of the invention.

What is claimed is:

1. A pneumatic spring and shock absorber assembly comprising:

a shock absorber including an outer cylinder;

said shock absorber having a longitudinal axis and defining an axial direction parallel to said longitudinal axis;

a pneumatic spring for applying a substantially axially directed force to said shock absorber;

said pneumatic spring comprising:

bellow means configured for expanding and contracting to provide said substantially axially directed force;

a roll-off tube surrounding at least a portion of said cylinder, said roll-off tube having a length disposed substantially parallel to said longitudinal axis;

means for holding said roll-off tube at one end portion of said cylinder; and said roll-off tube and said holding means together forming means for maintaining an axial position of said roll-off tube with respect to said shock absorber;

said shock absorber and said pneumatic spring together forming means for maintaining a circumferential position of said roll-off tube with respect to said shock absorber;

said means for maintaining an axial position of said roll-off tube comprising tab means disposed on said roll-off tube;

said means for maintaining an axial position of said roll-off tube comprising ring means disposed about said cylinder;

said ring means comprising a first surface and a second surface disposed opposite one another, said first surface being disposed to face towards an opposite end from said one end portion of said cylinder;

said tab means comprising at least one tab, said at least one tab being flexible between a first position and a second position, said first position being disposed nearer to said cylinder than said second position;

said first position comprising a locking position wherein said at least one tab is engaged with, and in substantial contact with, said first surface of said ring means, to prevent said roll-off tube from moving in a direction away from said opposite end of said cylinder; and said second position comprising an unlocked position wherein said at least one tab is disengaged from said first surface of said ring means, said second position being configured for facilitating installation of said pneumatic spring means on, and removal of said pneumatic spring means from, said shock absorber.

2. The pneumatic spring and shock absorber assembly according to claim 1 wherein said means for maintaining an axial position of said roll-off tube further comprises means for preventing said roll-off tube from moving in a direction towards said opposite end of said cylinder.

3. The pneumatic spring and shock absorber assembly according to claim 2 wherein said means for maintaining a circumferential position of said roll-off tube comprises:

a recess disposed in one of a) and b):
   a) said roll-off tube; and
   b) said shock absorber;

a projecting portion disposed on the other one of: said roll-off tube and said shock absorber, said projecting portion being configured for engaging with said recess to maintain said circumferential position of said roll-off tube with respect to said shock absorber.

4. The pneumatic spring and shock absorber assembly according to claim 3 wherein:
said piston rod comprises a first end portion and a second end portion disposed at a substantial distance from said first end portion of said piston rod;
said first end portion of said piston rod is disposed within said one end of said cylinder, and said second end portion of said piston rod extends out of said one end of said cylinder;
said pneumatic spring further comprises:
spring means disposed about at least a portion of said second end portion of said piston rod, said spring means being axially movable along with said piston rod;
deflector means disposed about at least a portion of said second end portion of said piston rod and between said spring means and said one end of said cylinder; and
said deflector means for preventing substantial axial movement of said spring means towards said one end of said cylinder.

5. The pneumatic spring and shock absorber assembly according to claim 4 wherein:
said roll-off tube has a first end part and a second end part disposed a substantial distance from said first end part;
said first end part of said roll-off tube is disposed adjacent said bellow means;
said first end part of said roll-off tube comprises said deflector means, said deflector means being integral with said first end part of said roll-off tube;
said second end part of said roll-off tube is disposed adjacent said ring means;
said pneumatic spring further comprises an outer tube disposed about said second end portion of said piston rod;
said bellow means has a first end and a second end, said first end of said bellow means being attached to said one end of said roll-off tube;
said second end of said bellow means is attached to said outer tube;
said shock absorber further comprises a spring bracket;
said means for preventing comprises a stop portion disposed substantially perpendicular to said longitudinal axis and immediately adjacent said one end of said cylinder;
said stop portion comprises a surface disposed to make substantial contact with said one end of said cylinder;
said deflector means comprises said stop portion and is integral with said stop portion;
said deflector means comprises a surface disposed substantially perpendicular to said longitudinal axis and facing away from said one end of said cylinder, said surface of said deflector means being configured for preventing substantial movement of said spring means towards said one end of said cylinder;
said roll-off tube comprises an interior portion and an exterior portion, said interior portion being disposed adjacent said cylinder;
at least a portion of said exterior portion is in contact with at least a portion of said bellow means;
said spring means is disposed within said outer tube;
said outer tube and said bellow means define a substantial portion of a spring chamber;
said surface of said deflector means is disposed to face said spring chamber;
said pneumatic spring further comprises:
means for sealing said spring chamber from the environment, said sealing means being disposed between said interior portion of said roll-off tube and said cylinder;
a stone guard, said stone guard being disposed to encircle a substantial portion of said cylinder;
said stone guard comprises a substantial U-shape and is integral with said roll-off tube and said at least one tab;
means for providing compressed air to said spring chamber;
said shock absorber further comprises:
a first end portion and a second end portion disposed at a substantial distance from said first end portion of said shock absorber;
said first end portion of said shock absorber comprises said one end of said cylinder;
said second end portion of said shock absorber is disposed adjacent said opposite end of said cylinder;
a piston rod guide disposed within said one end of said cylinder for guiding said piston rod within said cylinder;
first means for connecting said second end portion of said piston rod to a body of the motor vehicle;
second means for connecting said second end portion of said shock absorber to a suspension of the motor vehicle; said projecting portion projects substantially radially from one of: said roll-off tube and said shock absorber; and
said pneumatic spring means is configured for being installed on said shock absorber in a rotational manner.

6. The pneumatic spring and shock absorber assembly according to claim 4 wherein:
said roll-off tube has a first end part and a second end part disposed a substantial distance from said first end part;
said first end part of said roll-off tube is disposed adjacent said bellow means;
said deflector means is separate from said roll-off tube, said deflector means being disposed substantially adjacent said one end of said roll-off tube;
said second end part of said roll-off tube is disposed adjacent said ring means;
said pneumatic spring further comprises an outer tube disposed about said second end portion of said piston rod;
said bellow means has a first end and a second end, said first end of said bellow means being attached to said first end part of said roll-off tube;
said second end of said bellow means is attached to said outer tube;
said shock absorber further comprises a spring bracket;
said means for preventing comprises a stop portion disposed substantially perpendicular to said longitudinal axis and immediately adjacent said one end of said cylinder;
said stop portion comprises a surface disposed to make substantial contact with said first end portion of said cylinder;
said deflector means comprises said stop portion and is integral with said stop portion;
said deflector means comprises a surface disposed substantially perpendicular to said longitudinal axis and facing away from said one end of said cylinder, said surface of said deflector means being configured for preventing substantial movement of said spring means towards said one end of said cylinder;

said roll-off tube comprises an interior portion and an exterior portion, said interior portion being disposed adjacent said cylinder;

at least a portion of said exterior portion is in contact with at least a portion of said bellow means;

said spring means is disposed within said outer tube;

said outer tube and said bellow means define a substantial portion of a spring chamber;

said surface of said deflector means is disposed to face said spring chamber;

said pneumatic spring further comprises:

means for sealing said spring chamber from the environment, said sealing means being disposed between said interior portion of said roll-off tube and said cylinder;

a stone guard, said stone guard being disposed to encircle a substantial portion of said cylinder;

said stone guard comprises a substantial U-shape and is integral with said roll-off tube and said at least one tab;

means for providing compressed air to said spring chamber;

said shock absorber further comprises:

a first end portion and a second end portion disposed at a substantial distance from said first end portion of said shock absorber;

said first end portion of said shock absorber comprises said one end of said cylinder;

said second end portion of said shock absorber is disposed adjacent said opposite end of said cylinder;

a piston rod guide disposed within said one end of said cylinder for guiding said piston rod within said cylinder;

first means for connecting said second end portion of said piston rod to a body of the motor vehicle;

second means for connecting said second end portion of said shock absorber to a suspension of the motor vehicle;

said projecting portion projects substantially radially from one of: said roll-off tube and said shock absorber; and said pneumatic spring means is configured for being installed on said shock absorber in a rotational manner.

7. The pneumatic spring and shock absorber assembly according to claim 4 wherein:

said roll-off tube has a first end part and a second end part disposed a substantial distance from said first end part;

said first end part of said roll-off tube is disposed adjacent said bellow means;

said first end part of said roll-off tube comprises said deflector means, said deflector means being integral with said first end part of said roll-off tube;

said second end part of said roll-off tube is disposed adjacent said ring means;

said pneumatic spring further comprises an outer tube disposed about said second end portion of said piston rod;

said bellow means has a first end and a second end, said first end of said bellow means being attached to said first end part of said roll-off tube;

said second end of said bellow means is attached to said outer tube;

said shock absorber further comprises a spring bracket;

said means for preventing comprises said second end part of said roll-off tube;

said second end part of said roll-off tube comprises a surface disposed to face said ring means, said surface of said second end part making substantial contact with said second surface of said ring means;

said surface of said second end part is disposed substantially perpendicular to said longitudinal axis;

said deflector means comprises a surface disposed substantially perpendicular to said longitudinal axis and facing away from said one end of said cylinder, said surface of said deflector means being configured for preventing substantial movement of said spring means towards said one end of said cylinder;

said roll-off tube comprises an interior portion and an exterior portion, said interior portion being disposed adjacent said cylinder;

at least a portion of said exterior portion is in contact with at least a portion of said bellow means;

said spring means is disposed within said outer tube;

said outer tube and said bellow means define a substantial portion of a spring chamber;

said surface of said deflector means is disposed to face said spring chamber;

said pneumatic spring further comprises:

means for sealing said spring chamber from the environment, said sealing means being disposed between said interior portion of said roll-off tube and said cylinder;

a stone guard, said stone guard being disposed to encircle a substantial portion of said cylinder;

said stone guard comprises a substantial U-shape and is integral with said roll-off tube and said at least one tab;

means for providing compressed air to said spring chamber;

said shock absorber further comprises:

a first end portion and a second end portion disposed at a substantial distance from said first end portion of said shock absorber;

said first end portion of said shock absorber comprises said one end of said cylinder;

said second end portion of said shock absorber is disposed adjacent said opposite end of said cylinder;

a piston rod guide disposed within said one end of said cylinder for guiding said piston rod within said cylinder;

first means for connecting said second end portion of said piston rod to a body of the motor vehicle;

second means for connecting said second end portion of said shock absorber to a suspension of the motor vehicle;

said projecting portion projects substantially radially from one of: said roll-off tube and said shock absorber;

said pneumatic spring means is configured for being installed on said shock absorber in a rotational manner.

8. The pneumatic spring and shock absorber assembly according to claim 4 wherein:

said roll-off tube has a first end part and a second end part disposed a substantial distance from said first end part;

said first end part of said roll-off tube is disposed adjacent said bellow means;

said deflector means is separate from said roll-off tube, said deflector means being disposed substantially adjacent said first end part of said roll-off tube;

said second end part of said roll-off tube is disposed adjacent said ring means;

said second end part of said roll-off tube is disposed adjacent said ring means;

said pneumatic spring further comprises an outer tube disposed about said second end portion of said piston rod;

said bellow means has a first end and a second end, said first end of said bellow means being attached to said first end part of said roll-off tube;

said second end of said bellow means is attached to said outer tube;

said shock absorber further comprises a spring bracket;

said means for preventing comprises said second end part of said roll-off tube;

said second end part of said roll-off tube comprises a surface disposed to face said ring means, said surface of said second end part making substantial contact with said second surface of said ring means;

said surface of said second end part is disposed substantially perpendicular to said longitudinal axis;

said deflector means comprises a surface disposed substantially perpendicular to said longitudinal axis and facing away from said one end of said cylinder, said surface of said deflector means being configured for preventing substantial movement of said spring means towards said one end of said cylinder;

said roll-off tube comprises an interior portion and an exterior portion, said interior portion being disposed adjacent said cylinder;

at least a portion of said exterior portion is in contact with at least a portion of said bellow means;

said spring means is disposed within said outer tube;

said outer tube and said bellow means define a substantial portion of a spring chamber;

said surface of said deflector means is disposed to face said spring chamber;

said pneumatic spring further comprises:
  means for sealing said spring chamber from the environment, said sealing means being disposed between said interior portion of said roll-off tube and said cylinder;
  a stone guard, said stone guard being disposed to encircle a substantial portion of said cylinder;
  said stone guard comprises a substantial U-shape and is integral with said roll-off tube and said at least one tab;
  means for providing compressed air to said spring chamber;

said shock absorber further comprises:
  a first end portion and a second end portion disposed at a substantial distance from said first end portion of said shock absorber;
  said first end portion of said shock absorber comprises said one end of said cylinder;
  said second end portion of said shock absorber is disposed adjacent said opposite end of said cylinder;
  a piston rod guide disposed within said one end of said cylinder for guiding said piston rod within said cylinder;
  first means for connecting said second end portion of said piston rod to a body of the motor vehicle;
  second means for connecting said second end portion of said shock absorber to a suspension of the motor vehicle;

said projecting portion projects substantially radially from one of: said roll-off tube and said shock absorber;

said pneumatic spring means is configured for being installed on said shock absorber in a rotational manner.

9. A pneumatic spring and shock absorber assembly, said assembly comprising:

a shock absorber including an outer cylinder and ring means disposed about and attached to said cylinder;

said shock absorber having a longitudinal axis and defining an axial direction parallel to the longitudinal axis;

bellow means, said bellow means comprising a rolling diaphram ;

a pneumatic spring including said rolling diaphragm, said pneumatic spring being attached at one end of said cylinder via a roll-off tube;

said roll-off tube including attachment means at one end thereof for said rolling diaphragm;

means for maintaining a circumferential position of said roll-off tube with respect to said shock absorber;

holding means for maintaining an axial position of said roll-off tube with said shock absorber;

said holding means comprising a stop portion disposed substantially perpendicular to said longitudinal axis and immediately adjacent said one end of said cylinder, said roll-off tube being substantially supported on said cylinder by means of said stop portion;

said stop portion having means for preventing substantial movement of said roll-off tube towards an opposite end of said cylinder;

said holding means further comprising ring means being disposed about said cylinder and attached to said shock absorber;

said ring means comprising a first surface and a second surface being disposed opposite one another, said first surface being disposed to face away from said opposite end of said cylinder;

said roll-off tube further comprising a first end part and a second end part being disposed a substantial distance from said first end part of said roll-off tube;

said first end part being disposed adjacent said rolling diaphragm;

said second end part being disposed adjacent said first surface of said ring means;

said means for maintaining a circumferential position comprising a recess being disposed on said roll-off tube;

said means for maintaining a circumferential position further comprising a projecting portion being disposed on said shock absorber, said projecting portion being configured for engaging with said recess to maintain said circumferential position of said roll-off tube with respect to said shock absorber;

said projecting portion projecting substantially radially away from said shock absorber;

said piston rod comprising a first end portion and a second end portion being disposed at a substantial distance from said first end portion of said piston rod;

said first end portion of said piston rod being disposed within said one end of said cylinder, and said second end portion of said piston rod extending out of said one end of said cylinder;

said pneumatic spring and shock absorber assembly further comprising:

spring means being disposed about at least a portion of said second end portion of said piston rod, said spring means being axially movable along with said piston rod;

deflector means being disposed about at least a portion of said second end portion of said piston rod and between said spring means and said one end of said cylinder; and said deflector means for preventing substantial axial movement of said spring means towards said one end of said cylinder;

said deflector means comprising said stop portion;

said first end part of said roll-off tube comprising said deflector means, said deflector means being integral with said first end part of said roll-off tube; said pneumatic spring and shock absorber assembly further comprising an outer tube being disposed about said second end portion of said piston rod;

said rolling diaphragm having a first end and a second end, said first end of said rolling diaphragm being attached to said first end part of said roll-off tube;

said second end of said rolling diaphragm being attached to said outer tube;

said shock absorber further comprising a spring bracket;

said means for preventing substantial movement of said roll-off tube towards said opposite end of said cylinder of said stop portion comprising a surface being disposed immediately adjacent said one end of said cylinder;

said deflector means comprising a surface being disposed substantially perpendicular to said longitudinal axis and facing away from said surface of said stop portion, said surface of said deflector means being configured for preventing said substantial movement of said spring means towards said one end of said cylinder;

said roll-off tube comprising an interior portion and an exterior portion, said interior portion being disposed adjacent said cylinder;

at least a portion of said exterior portion being in contact with at least a portion of said rolling diaphragm;

said spring means being disposed within said outer tube;

said outer tube and said bellow means defining a substantial portion of a spring chamber;

said surface of said deflector means being disposed to face said spring chamber;

said pneumatic spring and shock absorber assembly further comprising:

means for sealing said spring chamber from the environment, said sealing means being disposed between said interior portion of said roll-off tube and said cylinder;

a stone guard, said stone guard being disposed to encircle a substantial portion of said cylinder;

said stone guard comprising a substantial U-shape and being integral with said roll-off tube;

means for providing compressed air to said spring chamber;

said shock absorber further comprising:

a first end portion and a second end portion being disposed at a substantial distance from said first end portion of said shock absorber;

said first end portion of said shock absorber comprising said one end of said cylinder;

said second end portion of said shock absorber being disposed adjacent said opposite end of said cylinder;

a piston rod guide being disposed within said one end of said cylinder for guiding said piston rod within said cylinder;

first means for connecting said second end portion of said piston rod to a body of the motor vehicle; and second means for connecting said second end portion of said shock absorber to a suspension of the motor vehicle; and said pneumatic spring means being configured for being installed on said shock absorber in a rotational manner.

10. The pneumatic spring and shock absorber assembly according to claim 9 wherein:

said holding means further comprises at least one tab disposed on said roll-off tube for providing additional axial fixing of said roll-off tube with respect to said shock absorber;

said at least one tab is flexible between a first position and a second position;

said first position comprises a locked position wherein said at least one tab is engaged with said first surface of said ring means to lock said roll-off tube in said axial position with respect to said shock absorber, to prevent said roll-off tube from moving in a direction away from said opposite end of said cylinder; and said second position comprises an unlocked position wherein said at least one tab is disengaged from said first surface of said ring means.

11. A pneumatic spring and shock absorber assembly, said assembly comprising:

a shock absorber including an outer cylinder and ring means disposed about and attached to said cylinder;

bellow means, said bellow means comprising a rolling diaphram;

a pneumatic spring including said rolling diaphragm, said pneumatic spring being attached at one end of said cylinder via a roll-off tube;

said roll-off tube including attachment means at one end thereof for said rolling diaphragm and a holding means for attachment to said cylinder at an opposite end thereof;

said holding means including at least one tab;

said at least one tab being flexible between a first position and a second position;

said first position comprising a locking position wherein said at least one tab is engaged with said ring means to hold said roll-off tube onto said cylinder; and said second position comprising an unlocked position wherein said at least one tab is disengaged from said ring means.

12. The pneumatic spring and shock absorber assembly according to claim 11, wherein:

said at least one tab comprises an end surface;

said end surface of said at least one tab is disposed on an exterior surface of said roll-off tube;

said ring means comprises an end surface;

said end surface of said ring means is disposed on an exterior surface of said ring means; and said end surface of said at least one tab is disposed to contact a portion of said end surface of said ring means to engage said at least one tab with said ring means.

13. The pneumatic spring and shock absorber assembly according to claim 12 further comprising:

means for maintaining a circumferential position of said roll-off tube with respect to said shock absorber;

said means for maintaining a circumferential position comprising:
  a recess disposed in one of a) and b):
   a) said roll-off tube; and
   b) said shock absorber;
  a projecting portion disposed on the other one of: said roll-off tube and said shock absorber, said projecting portion being configured for engaging with said recess to maintain said circumferential position of said roll-off tube with respect to said shock absorber.

14. The pneumatic spring and shock absorber assembly according to claim 11, wherein:
  said shock absorber and said roll-off tube together form means for maintaining a circumferential position of said roll-off tube with respect to said shock absorber.

15. The pneumatic spring and shock absorber assembly according to claim 14, wherein said means for maintaining a circumferential position of said roll-off tube comprises:
  a recess disposed on said shock-absorber; and
  a projecting portion disposed on said roll-off tube, said projecting portion being configured for engaging with said recess to maintain said circumferential position of said roll-off tube with respect to said shock absorber; and
  said projecting portion projects substantially radially from said roll-off tube.

16. The pneumatic spring and shock absorber assembly according to claim 14, wherein said means for maintaining a circumferential position of said roll-off tube comprises:
  a recess disposed on said roll-off tube; and
  a projecting portion disposed on said shock absorber, said projecting portion being configured for engaging with said recess to maintain said circumferential position of said roll-off tube with respect to said shock absorber; and
  said projecting portion projects substantially radially from said shock absorber.

17. A pneumatic spring and shock absorber assembly, said assembly comprising:
  a shock absorber including an outer cylinder and ring means disposed about and attached to said cylinder;
  said shock absorber having a longitudinal axis and defining an axial direction parallel to the longitudinal axis;
  bellow means, said bellow means comprising a rolling diaphram;
  a pneumatic spring including said rolling diaphragm, said pneumatic spring being attached at one end of said cylinder via a roll-off tube;
  said roll-off tube including attachment means at one end thereof for said rolling diaphragm;
  means for maintaining a circumferential position of said roll-off tube with respect to said shock absorber;
  holding means for maintaining an axial position of said roll-off tube with said shock absorber;
  said holding means comprising a stop portion disposed substantially perpendicular to said longitudinal axis and immediately adjacent said one end of said cylinder, said roll-off tube being substantially supported on said cylinder by means of said stop portion;
  said stop portion having means for preventing substantial movement of said roll-off tube towards an opposite end of said cylinder;
  said holding means further comprising ring means being disposed about said cylinder and attached to said shock absorber;
  said ring means comprising a first surface and a second surface being disposed opposite one another, said first surface being disposed to face away from said opposite end of said cylinder;
  said roll-off tube further comprising a first end part and a second end part being disposed a substantial distance from said first end part of said roll-off tube;
  said first end part being disposed adjacent said rolling diaphragm;
  said second end part being disposed adjacent said first surface of said ring means;
  said means for maintaining a circumferential position further comprising a recess being disposed on said shock absorber;
  said means for maintaining a circumferential position comprising a projecting portion being disposed on said roll-off tube, said projecting portion being configured for engaging with said recess to maintain said circumferential position with respect to said shock absorber;
  said projecting portion projecting substantially radially from said roll-off tube;
  said piston rod comprising a first end portion and a second end portion being disposed at a substantial distance from said first end portion of said piston rod;
  said first end portion of said piston rod being disposed within said one end of said cylinder, and said second end portion of said piston rod extending out of said one end of said cylinder;
  said pneumatic spring and shock absorber assembly further comprising:
   spring means being disposed about at least a portion of said second end portion of said piston rod, said spring means being axially movable along with said piston rod;
   deflector means being disposed about at least a portion of said second end portion of said piston rod and between said spring means and said one end of said cylinder; and
   said deflector means for preventing substantial axial movement of said spring means towards said one end of said cylinder;
  said deflector means comprising said stop portion;
  said first end part of said roll-off tube comprising said deflector means, said deflector means being integral with said first end part of said roll-off tube;
  said pneumatic spring and shock absorber assembly further comprising an outer tube being disposed about said second end portion of said piston rod;
  said rolling diaphragm having a first end and a second end, said first end of said rolling diaphragm being attached to said first end part of said roll-off tube;
  said second end of said rolling diaphragm being attached to said outer tube;
  said shock absorber further comprising a spring bracket;
  said means for preventing substantial movement of said roll-off tube towards said opposite end of said cylinder of said stop portion comprising a surface being disposed immediately adjacent said one end of said cylinder;
  said deflector means comprising a surface being disposed substantially perpendicular to said longitudinal axis and facing away from said surface of said stop portion, said surface of said deflector means being configured for preventing said substantial movement of said spring means towards said one end of said cylinder;

said roll-off tube comprising an interior portion and an exterior portion, said interior portion being disposed adjacent said cylinder;

at least a portion of said exterior portion being in contact with at least a portion of said rolling diaphragm;

said spring means being disposed within said outer tube;

said outer tube and said bellow means defining a substantial portion of a spring chamber;

said surface of said deflector means being disposed to face said spring chamber;

said pneumatic spring and shock absorber assembly further comprising:
means for sealing said spring chamber from the environment, said sealing means being disposed between said interior portion of said roll-off tube and said cylinder;
a stone guard, said stone guard being disposed to encircle a substantial portion of said cylinder;
said stone guard comprising a substantial U-shape and being integral with said roll-off tube;
means for providing compressed air to said spring chamber;

said shock absorber further comprising:
a first end portion and a second end portion being disposed at a substantial distance from said first end portion of said shock absorber;
said first end portion of said shock absorber comprising said one end of said cylinder;
said second end portion of said shock absorber being disposed adjacent said opposite end of said cylinder;
a piston rod guide being disposed within said one end of said cylinder for guiding said piston rod within said cylinder;
first means for connecting said second end portion of said piston rod to a body of the motor vehicle; and
second means for connecting said second end portion of said shock absorber to a suspension of the motor vehicle; and said pneumatic spring means being configured for being installed on said shock absorber in a rotational manner.

18. A pneumatic spring and shock absorber assembly, said assembly comprising:
a shock absorber including an outer cylinder and ring means disposed about and attached to said cylinder;
said shock absorber having a longitudinal axis and defining an axial direction parallel to the longitudinal axis;
bellow means, said bellow means comprising a rolling diaphram;
a pneumatic spring including said rolling diaphragm, said pneumatic spring being attached at one end of said cylinder via a roll-off tube;
said roll-off tube including attachment means at one end thereof for said rolling diaphragm;
means for maintaining a circumferential position of said roll-off tube with respect to said shock absorber;
holding means for maintaining an axial position of said roll-off tube with said shock absorber;
said holding means comprising a stop portion disposed substantially perpendicular to said longitudinal axis and immediately adjacent said one end of said cylinder, said roll-off tube being substantially supported on said cylinder by means of said stop portion;
said stop portion having means for preventing substantial movement of said roll-off tube towards an opposite end of said cylinder;

said holding means further comprising ring means being disposed about said cylinder and attached to said shock absorber;

said ring means comprising a first surface and a second surface being disposed opposite one another, said first surface being disposed to face away from said opposite end of said cylinder;

said roll-off tube further comprising a first end part and a second end part being disposed a substantial distance from said first end part of said roll-off tube;

said first end part being disposed adjacent said rolling diaphragm;

said second end part being disposed adjacent said first surface of said ring means;

said means for maintaining a circumferential position comprising a recess being disposed on said roll-off tube;

said means for maintaining a circumferential position further comprising a projecting portion being disposed on said shock absorber, said projecting portion being configured for engaging with said recess to maintain said circumferential position of said roll-off tube with respect to said shock absorber;

said projecting portion projecting substantially radially from said shock absorber;

said piston rod comprising a first end portion and a second end portion being disposed at a substantial distance from said first end portion of said piston rod;

said first end portion of said piston rod being disposed within said one end of said cylinder, and said second end portion of said piston rod extending out of said one end of said cylinder;

said pneumatic spring and shock absorber assembly further comprising:
spring means being disposed about at least a portion of said second end portion of said piston rod, said spring means being axially movable along with said piston rod;
deflector means being disposed about at least a portion of said second end portion of said piston rod and between said spring means and said one end of said cylinder; and
said deflector means for preventing substantial axial movement of said spring means towards said one end of said cylinder;

said deflector means comprising said stop portion;

said deflector means being separate from said roll-off tube, said deflector means being disposed substantially adjacent said first end part of said roll-off tube;

said pneumatic spring and shock absorber assembly further comprising an outer tube being disposed about said second end portion of said piston rod;

said rolling diaphragm having a first end and a second end, said first end of said rolling diaphragm being attached to said first end part of said roll-off tube;

said second end of said rolling diaphragm being attached to said outer tube;

said shock absorber further comprising a spring bracket;

said means for preventing substantial movement of said roll-off tube towards said opposite end of said cylinder of said stop portion comprising a surface being disposed immediately adjacent said one end of said cylinder;

said deflector means comprising a surface being disposed substantially perpendicular to said longitudinal axis and facing away from said surface of said stop portion, said surface of said deflector means being configured for preventing said substantial movement of said spring means towards said one end of said cylinder;

said roll-off tube comprising an interior portion and an exterior portion, said interior portion being disposed adjacent said cylinder;

at least a portion of said exterior portion being in contact with at least a portion of said rolling diaphragm;

said spring means being disposed within said outer tube;

said outer tube and said bellow means defining a substantial portion of a spring chamber;

said surface of said deflector means being disposed to face said spring chamber;

said pneumatic spring and shock absorber assembly further comprising:

means for sealing said spring chamber from the environment, said sealing means being disposed between said interior portion of said roll-off tube and said cylinder;

a stone guard, said stone guard being disposed to encircle a substantial portion of said cylinder;

said stone guard comprising a substantial U-shape and being integral with said roll-off tube;

means for providing compressed air to said spring chamber;

said shock absorber further comprising:

a first end portion and a second end portion being disposed at a substantial distance from said first end portion of said shock absorber;

said first end portion of said shock absorber comprising said one end of said cylinder;

said second end portion of said shock absorber being disposed adjacent said opposite end of said cylinder;

a piston rod guide being disposed within said one end of said cylinder for guiding said piston rod within said cylinder;

first means for connecting said second end portion of said piston rod to a body of the motor vehicle; and second means for connecting said second end portion of said shock absorber to a suspension of the motor vehicle; and said pneumatic spring means being configured for being installed on said shock absorber in a rotational manner.

19. A pneumatic spring and shock absorber assembly, said assembly comprising:

a shock absorber including an outer cylinder and ring means disposed about and attached to said cylinder;

said shock absorber having a longitudinal axis and defining an axial direction parallel to the longitudinal axis;

bellow means, said bellow means comprising a rolling diaphram ;

a pneumatic spring including said rolling diaphragm, said pneumatic spring being attached at one end of said cylinder via a roll-off tube;

said roll-off tube including attachment means at one end thereof for said rolling diaphragm;

means for maintaining a circumferential position of said roll-off tube with respect to said shock absorber;

holding means for maintaining an axial position of said roll-off tube with said shock absorber;

said holding means comprising a stop portion disposed substantially perpendicular to said longitudinal axis and immediately adjacent said one end of said cylinder, said roll-off tube being substantially supported on said cylinder by means of said stop portion;

said stop portion having means for preventing substantial movement of said roll-off tube towards an opposite end of said cylinder;

said holding means further comprising ring means being disposed about said cylinder and attached to said shock absorber;

said ring means comprising a first surface and a second surface being disposed opposite one another, said first surface being disposed to face away from said opposite end of said cylinder;

said roll-off tube further comprising a first end part and a second end part being disposed a substantial distance from said first end part of said roll-off tube;

said first end part being disposed adjacent said rolling diaphragm;

said second end part being disposed adjacent said first surface of said ring means;

said means for maintaining a circumferential position further comprising a recess being disposed on said shock absorber;

said means for maintaining a circumferential position comprising a projecting portion being disposed on said roll-off tube, said projecting portion being configured for engaging with said recess to maintain said circumferential position of said roll-off tube with respect to said shock absorber;

said projecting portion projecting substantially radially from said roll-off tube;

said piston rod comprising a first end portion and a second end portion being disposed at a substantial distance from said first end portion of said piston rod;

said first end portion of said piston rod being disposed within said one end of said cylinder, and said second end portion of said piston rod extending out of said one end of said cylinder;

said pneumatic spring and shock absorber assembly further comprising:

spring means being disposed about at least a portion of said second end portion of said piston rod, said spring means being axially movable along with said piston rod;

deflector means being disposed about at least a portion of said second end portion of said piston rod and between said spring means and said one end of said cylinder; and said deflector means for preventing substantial axial movement of said spring means towards said one end of said cylinder;

said deflector means comprising said stop portion;

said deflector means being separate from said roll-off tube, said deflector means being disposed substantially adjacent said first end part of said roll-off tube;

said pneumatic spring and shock absorber assembly further comprising an outer tube being disposed about said second end portion of said piston rod;

said rolling diaphragm having a first end and a second end, said first end of said rolling diaphragm being attached to said first end part of said roll-off tube;

said second end of said rolling diaphragm being attached to said outer tube;

said shock absorber further comprising a spring bracket;

said means for preventing substantial movement of said roll-off tube towards said opposite end of said cylinder of said stop portion comprising a surface being disposed immediately adjacent said one end of said cylinder;

said deflector means comprising a surface being disposed substantially perpendicular to said longitudinal axis and facing away from said surface of said stop portion, said surface of said deflector means being configured for preventing said substantial movement of said spring means towards said one end of said cylinder;

said roll-off tube comprising an interior portion and an exterior portion, said interior portion being disposed adjacent said cylinder;

at least a portion of said exterior portion being in contact with at least a portion of said rolling diaphragm;

said spring means being disposed within said outer tube;

said outer tube and said bellow means defining a substantial portion of a spring chamber;

said surface of said deflector means being disposed to face said spring chamber;

said pneumatic spring and shock absorber assembly further comprising:

means for sealing said spring chamber from the environment, said sealing means being disposed between said interior portion of said roll-off tube and said cylinder;

a stone guard, said stone guard being disposed to encircle a substantial portion of said cylinder;

said stone guard comprising a substantial U-shape and being integral with said roll-off tube;

means for providing compressed air to said spring chamber;

said shock absorber further comprising:

a first end portion and a second end portion being disposed at a substantial distance from said first end portion of said shock absorber;

said first end portion of said shock absorber comprising said one end of said cylinder;

said second end portion of said shock absorber being disposed adjacent said opposite end of said cylinder;

a piston rod guide being disposed within said one end of said cylinder for guiding said piston rod within said cylinder;

first means for connecting said second end portion of said piston rod to a body of the motor vehicle; and second means for connecting said second end portion of said shock absorber to a suspension of the motor vehicle; and said pneumatic spring means being configured for being installed on said shock absorber in a rotational manner.

* * * * *

UNITED STATES PATENT AND TRADEMARK OFFICE
CERTIFICATE OF CORRECTION

PATENT NO. : 5,649,691
DATED : July 22, 1997
INVENTOR(S) : Günther HANDKE and Rolf WENGENROTH It is certified that error appears in the above-identified patent and that said Letters Patent is hereby corrected as shown below:

In column 2, line 54, before the first occurrence of 'roll', delete "end" and insert --and--.

In column 4, line 53, after the second occurrence of 'mounting', delete "devise" and insert --device--.

In column 4, line 56, after 'chamber', delete "B," and insert --5,--.

In column 6, line 11, after 'left', delete "end" and insert --and--.

In column 10, line 1, after 'jacket', delete "22B." and insert --225.--.

In column 10, line 55, after 'other', delete "bend" and insert --hand--.

UNITED STATES PATENT AND TRADEMARK OFFICE
CERTIFICATE OF CORRECTION

PATENT NO. : 5,649,691
DATED : July 22, 1997
INVENTOR(S) : Günther HANDKE and Rolf WENGENROTH It is certified that error appears in the above-identified patent and that said Letters Patent is hereby corrected as shown below:

In column 20, line 34, Claim 11, delete "diaphram;" and insert --diaphragm;--.

In column 21, line 46, Claim 17, delete "diaphram;" and insert --diaphragm;--.

In column 23, line 49, Claim 18, delete "diaphram;" and insert --diaphragm;--.

In column 25, line 54, Claim 19, delete "diaphram;" and insert --diaphragm;--.

Signed and Sealed this

Twenty-third Day of June, 1998

Attest:

BRUCE LEHMAN

*Attesting Officer*    *Commissioner of Patents and Trademarks*